United States Patent [19]
Brandt

[11] 3,897,335
[45] July 29, 1975

[54] LIQUID COOLANT TREATING PROCESS AND APPARATUS

[75] Inventor: Robert H. Brandt, Bowling Green, Ohio

[73] Assignee: Henry Manufacturing Co., Inc., Bowling Green, Ohio

[22] Filed: Mar. 6, 1973

[21] Appl. No.: 338,527

[52] U.S. Cl. ............... 210/71; 210/167; 210/171; 210/187; 210/525
[51] Int. Cl. ............................................ B01d 17/04
[58] Field of Search ............ 210/71, 167, 168, 171, 210/175, 178, 187, 64, 74, 83, 525; 184/1 E, 6.21, 6.22, 6.24

[56] References Cited
UNITED STATES PATENTS

| | | | |
|---|---|---|---|
| 2,140,289 | 12/1938 | Hurtt et al. | 210/167 X |
| 2,484,205 | 10/1949 | Candler | 210/175 X |
| 2,578,040 | 12/1951 | Booth et al. | 210/168 X |
| 2,713,919 | 7/1955 | Walker et al. | 210/187 X |
| 3,228,829 | 1/1966 | Wolf et al. | 210/64 X |
| 3,334,749 | 8/1967 | Ladd | 210/167 X |
| 3,341,983 | 9/1967 | Baldenhofer et al. | 210/167 X |
| 3,377,275 | 4/1968 | Michalski et al. | 210/64 |
| 3,455,457 | 7/1969 | Popelar | 210/168 |
| 3,750,847 | 8/1973 | Sluhan | 184/1 E |

Primary Examiner—Samih N. Zaharna
Assistant Examiner—Robert G. Mukai

[57] ABSTRACT

A continuous process for bleeding off of a portion of the clean aqueous base coolant containing water, oil and additives from a central coolant system into a heated substantially quiescent pool to kill bacteria therein which heat also: (1) breaks out mechanically emulsified tramp oil from the coolant which is skimmed off, (2) frees some solid contaminants for removal, and (3) "tightens" the chemically emulsified oils; and the resulting sterilized and cleaned coolant is returned to the central coolant system.

The apparatus for performing this process may comprise a by-pass valve in the output duct from the return pump for the coolant system, a heat exchanger for the by-passed coolant, a settling tank in which a heater is located, and a skimmer for the separated tramp oil and flotsam from the tank, which tank may also include a bottom scraper for heavier fine particles or solid contaminants that may settle in the tank. From this settling tank the cleaned and sterilized coolant may be pumped to a clean tank and/or to a mixer for make-up materials before passing through the heat exchanger and being returned to the coolant system.

2 Claims, 5 Drawing Figures

LIQUID COOLANT TREATING PROCESS AND APPARATUS

BACKGROUND OF THE INVENTION

This invention is concerned with central coolant systems for machine tools and the like, wherein "soluble oil" coolants are utilized to flush grinding wheels, drill bits, cutting tools and the like during use. The coolants remove frictional heat, flush out waste particles, and lubricate the tools. The coolants are circulated through flumes or conduits to the individual tools and, generally, solid contaminants, such as grinding waste, cuttings, metal particles, etc., are removed by filters or settling tanks forming a part of the circulatory system for the coolant.

The "soluble oil" is an aqueous base emulsion of a sulfonated, chlorinated, surfactant-containing or otherwise solubilized petroleum-based oil or a water-emulsifiable or soluble synthetic material. Sometimes mixtures of these two types of materials are utilized.

The largest problem in dealing with such soluble oil coolant systems is the presence of bacterial growth in the system. The inevitable presence of bacteria, the tremendous populations of bacteria, and the resultant problems of plant odor, worker health, deterioration of coolant efficiency, reduction in filterability and other difficulties in cleansing solid contaminants from the coolant, the possibility of growth of harmful bacteria strains are all known in the art and the literature. See, for example, "Petroleum Micro-Biology", by Beerstecker, published by Elsevier Press, Inc., New York, N.Y. (1954) pages 332–345.

A secondary problem resides in the presence of "tramp oil" in the system. The "tramp oils" include lubricating oils, hydraulic fluids and the like which enter the coolant as the coolant circulates to the machine tools. Such oils are inevitably present and simply accumulate as a separate liquid phase. Also, solid particles wet with tramp oil can be carried into the tramp oil emulsion in the aqueous coolant and have a specific gravity close to that of the coolant emulsion, consequently solid contaminant particles do not settle when oil-wet, even after prolonged quiescence. Alternatively, oil-wet solid contaminant particles "smear" the filter screen or fibrous filter medium, and such oil-wet particles are not readily filterable. Due to the agitation of the system, the presence of excess emulsifier in the original "soluble oil", and the presence of finely divided solid contaminants forming "nucleating centers," a relatively large portion of the tramp oil becomes admixed in the system to varying degrees. This admixture ranges, in increasing degrees of separability, from a chemically loose emulsion to a mechanically tight emulsion to a mechanically loose emulsion to mixed oil and water to separate oil and water phases. After prolonged usage, the tramp oil content of the coolant may range up to 40%. Any tramp oil content in excess of 10% and sometimes in excess of about 5% interfers with coolant efficiency, burns at the tool working edge, smears any filter medium, entraps solid contaminants, forms a bacteria breeding ground and results in an oil mist in the plant which is an employee health hazard.

These problems of bacteria content and soluble oil content in soluble oil coolant systems have not been solved in the prior art. Complete chemical, biocidal or thermal sterilization of the large volume (about 1,000 to 100,000 gallons or greater) of coolant in continuous use is economically impractical and is impossible because of residual bacteria in the flumes, conduits and the machine tools themselves. Further, bacterial sterilization may result in fungus growth in the coolant. Skimming of tramp oil from a quiescent pool of coolant does not remove mechanically and chemically emulsified tramp oils nor does it remove that tramp oil wetting the solids particles. The addition of metered amounts of biocide, various ultraviolet radiation treatments, the use of increased amounts of surfactants and/or emulsifiers have all been unsuccessful in the long run.

SUMMARY OF THE INVENTION

Generally, this invention proposes the control of both bacteria and tramp oil in a soluble oil coolant system by the continual withdrawal, heating and return of a minor fraction of the coolant under conditions such that the coolant system (1) is maintained at a low bacteria level (on the order of about 5,000,000 bacteria count per milliliter), (2) is maintained at a tramp oil content which does not interfere with operation of the system, (3) is more readily freed of solid contaminants, and (4) appears to have a better, stabler, and/or finer particle emulsion.

More specifically, from 0.01% to about 10%, and preferably 0.1% to 1%, per minute by volume of the total volume of coolant circulating throughout the central coolant system is withdrawn from and by-passed through the apparatus of the present invention to be treated by the process of the present invention. Preferably, soluble oil coolant containing, as contaminants, live bacteria, tramp oil and solid contaminants is withdrawn after the circulating coolant has been subjected to a solids-removal treatment, either by filtration or settling or both.

The by-passed or withdrawn coolant is formed into a quiescent pool through which the coolant slowly circulates, and the coolant is retained in this substantially quiescent pool while being heated to a temperature which is sufficient to substantially simultaneously (1) kill bacteria in the coolant, (2) release tramp oil from the emulsion, and (3) free some solid contaminants from the emulsion and the oil. The tramp oil and the solid contaminants are separated from the substantially quiescent pool, and the heated, sterilized coolant which is substantially free of tramp oil and suspended solid particles is then returned to the central coolant system. Solely in order to conserve the requisite heat energy, the coolant returning to the central system can be utilized to pre-heat the withdrawn coolant prior to its introduction into the quiescent pool.

The withdrawn coolant is maintained in the quiescent pool while it is heated to and maintained at a sterilization temperature. This temperature may range from about 140°F, to about 200°F, and preferably from about 160°F to 180°F. The residence time at the elevated temperature is variable, being generally directly proportional to the tramp oil content, since sterilization at such temperatures is usually complete within a relatively short time, on the order of one minute at 160°F. Of course, one would expect these temperatures to kill the bacteria in the withdrawn coolant portion. However, the heating of the coolant accomplishes two other important unexpected functions, i.e., the heating (1) releases the tramp oil from emulsion, and (2) frees some of the solid contaminant particles from the tramp oil wetting them so that these particles can then be readily removed from the coolant. The tramp oil is removed from the surface of the quiescent pool by skimming. The oil-free contaminant particles can be removed by either settling or filtration, the efficiency of both the settling and filtering of the solid contaminant particles being promoted by their being oil-free.

Another surprising result of the heating is that the primary soluble oil-water emulsion is improved. The surfactant ingredients in the emulsion become more effective when heated, and the agitation of the hot emulsion as it flows from the quiescent pool back into the central coolant system, generally through a return pump, results in the formation of a "tighter," more uniform, emulsion of finer soluble oil globules in the aqueous carrier.

It has been found, in actual tests, that the withdrawing and by-passing of a relatively small fraction of the coolant in the central coolant system for processing in accordance with the present invention results in the substantial improvement of the emulsion within a relatively short period of time. The emulsion, when treated in accordance with this invention remains in a trouble-free, low bacteria state for an indefinite period of time with the addition of minimum amounts of the commonly used biocide and/or surfactant additives.

BRIEF DESCRIPTION OF THE DRAWINGS

The above mentioned and other features, objects and advantages, and manners of obtaining them are described more specifically below by reference to embodiments of this invention shown in the accompanying drawings, wherein:

DETAILED DESCRIPTION OF THE PREFERRED EMBODIMENTS The Process Of The Present Invention Generally, the process of the present invention is applicable to central coolant systems of the type illustrated schematically in FIG. 1. In FIG. 1 such a coolant system includes a conduit or flume arrangement for connecting a plurality of machined tools into a coolant circuit, so that coolant is distributed uniformly to each of the machine tools, flowed over the working parts of the machine tool and over the workpiece at the machine tool, the used coolant is collected from the various machine tools, passed through a filter or separator for removing chips, grinding waste, and other solid particles, and then recirculated back to the machine tools for distribution and recycling.

Figure 1:
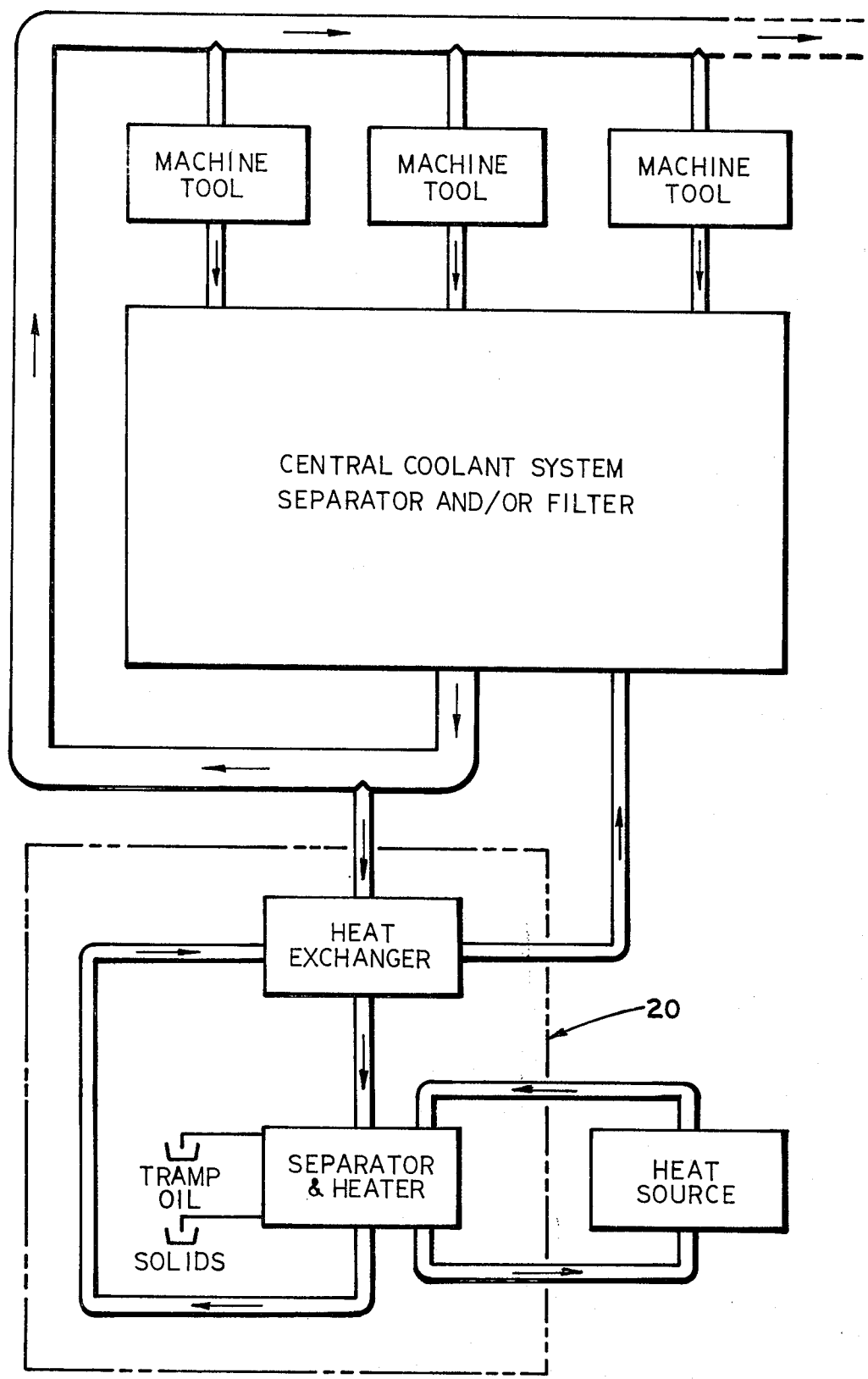
FIG. 1 is a flow diagram generic to each form of the apparatus and illustrating the processs of the present invention.

Central coolant systems of this type are quite large, and the volumes of coolants involved range from about 1,000 gallons to 100,000 gallons or more of coolant in continuous use. The coolant contains, as impurities, bacteria, tramp oil and solids and maybe some fungi. Larger solid particles may well be effectively removed by the filter or separator of the central coolant system, but tramp oils, particularly mechanically or chemically emulsified tramp oils, are not removed by normal filtration or separating techniques. In fact, the tramp oil contaminant "smears" any filter medium, whether paper, a screen or the like. The bacterial contaminant has the same "smearing" characteristic. Further, small solid particles which are wet by the tramp oil also are not removed, particularly in settling systems, as opposed to filtration systems. Upon removal of the tramp oil, the previously oil-wet particles can be much more readily removed. The bacteria -once killed- can (1) float to the surface as a froth for skimming, (2) settle with the solids or (3) remain in suspension. Their volume and character are such as not to interfere with the system.

In the practice of the present invention, a relatively minor part of the total coolant volume or, expressed another way, a relatively minor part of the coolant flow through the central coolant system, is by-passed through the apparatus 20 of the present invention. For example, from 0.01% to 10% of the total coolant system volume is by-passed per minute through the apparatus of the present invention. Preferably, the amount which is continuously bypassed ranges from about 0.1% to 1% of the total coolant system volume per minute through the apparatus 20 for treatment by the process of the present invention. Where only 1/10th of 1% of the total of volume of coolant in the central coolant system is withdrawn for treatment, a volume equal to the complete volume of coolant will be by-passed through the apparatus of the present invention during every 16 hours and 40 minutes of operation. Where one percent of the total volume is passed through the apparatus for each minute of operation, a volume equal to the entire volume will be by-passed through the apparatus every one hour and 40 minutes. It has generally been found that 1/10th of 1% per minute by-passed volume is sufficient.

Preferably, where the central coolant system is equipped with a filter or separator, the coolant for treatment by the present invention is withdrawn at the outlet side of the filter or separator —i.e. "clean" coolant is by-passed. This prevents the introduction of excess metal chips and other debris into the by-pass preheat heat exchanger and the remainder of the apparatus of this invention.

Generally, the by-passed liquid is heated to a temperature ranging from about 140°F to about 200°F, with a preferred temperature range being from about 160°F to about 180°F. At these temperatures, the coolant is sterilized and the bacteria is killed within about one minute, but it has been found that the release of tramp oil from emulsion and the freeing of solid contaminate oils from the emulsion best occurs over a greater period of time, generally on the order of ½ hour to 1 ½ hours.

The size of the quiescent pool into which the by-passed or withdrawn coolant is formed for a given by-pass flow is determined by the settling time necessary. The settling time necessary is determined by the two factors of (1) the amount of entrapped tramp oil in the coolant emulsion and (2) the amount of solids held in suspension in the emulsion. The flow rate can be increased and the time of quiescence decreased where lesser amounts of tramp oil and/or suspended articles are present in the by-passed coolant. Assuming a normal central coolant system, it may well be found that the initial operation of the apparatus of the present invention requires a residence time in the quiescent pool on the order of 60 minutes to adequately release the tramp oil and free the solid contaminants for removal. After some period of operation when the tramp oil content has been materially reduced and/or the solid contaminant content has been materially reduced, the residence time in the quiescent pool may be diminished by increasing the flow rate through the quiescent pool. The bactericidal effect remains the same — only sterile coolant is recycled to the system.

Although fungi which grow in the coolant is not killed by the heating process, some of it will be removed with the flotsam and tramp oil, so that its concentration also is decreased by the treating system.

The flow of the heated and cleaned coolant from the quiescent pool through the pre-heat heat exchanger to pre-heat the by-pass dirty coolant results in the saving of substantial heat. Where the by-passed fluid is heated within the range from 160° to 180°F., it is found that the by-passed fluid can be heated to a temperature on the order of 120°F in the pre-heat heat exchanger. The savings in heat can be readily appreciated.

As has been previously explained, the heating for sterilization results in an unusually efficient removal of tramp oil and solid contaminants. Those tramp oils which have been entrapped in the soluble oil coolant by various entrapment mechanisms— such as by chemical emulsion with residual surfactant content in the soluble oil or by being mechanically whipped into the emulsion because of agitation during flow of the coolant through the system — are ordinarily not removable from emulsion and the tramp oil content simply increase progressively during the life of the coolant system. The heating for sterilization breaks the loose tramp oil-coolant oil emulsion, and, upon quiescense of the heated coolant, the tramp oil simply "pops" to the surface from the emulsion. This removal of tramp oil then, apparently, leads to two other surprising results.

First, the removal of the tramp oil promotes the settling and gravitational removal of solid particles. Where a metallic particle, for example, is wet by tramp oil in the coolant emulsion, the particle simply will not settle out. The oil-wet particle has a specific gravity in combination with the oil which closely approximates that of the emulsion. Once the tramp oil is removed, the specific gravity of the oil-free particle may become greater than that of the coolant emulsion, and the particle settles out. These oil-free particles can either be removed in the apparatus 20 in FIG. 1 and FIGS. 2 through 5, or removed at the central system filter or separator. In any event, the efficiency of solids removal is materially increased.

Secondly, the removal of the tramp oil from the coolant emulsion may well release any excess surfactant content in the emulsion itself to improve the emulsification of the soluble oil in the aqueous primary vehicle. This is particularly noticeable where a heated coolant emulsion is rapidly agitated, as being passed through a pump, on its way back to the central coolant system.

Thus the by-passed or withdrawn coolant is sterilized, and is returned to and mixed with the remaining coolant in the central coolant system. The system, as a whole, is not sterilized, but the amount of bacteria in the system is reduced and controlled to a desired, non deleterious level, preferably on the order of 5,000,000 count per milliliter. At this level the fungi are also controlled, which means that less fungicide needs to be added to the coolant. The reason for this unexpected result is that bacteria preferentially feeds on the same materials as does the fungi, therefore the fungi does not have nearly the chance to bloom and cause further contamination and difficulties. Where the bacteria in the aqueous coolant in the central coolant system is maintained below about five million count per milliliter, but not entirely eliminated, the growth of fungi can be kept under control.

As in all plant operations, the operation of central coolant systems is quite an empirical art, but operators of systems utilizing the apparatus and process of the present invention describe the returning emulsion —i.e. after treatment by the process of the present invention—as "tight", i.e., a milky-white, oil-free aqueous emulsion having extremely finely divided globules of soluble oil therein, and as "sweet", i.e. free of odious bacteria.

Normally, in the empirical plant operation of central soluble oil coolant systems, a biocide, and additional surfactant are added to the coolant on a regular, usually weekly, basis. While it is not claimed that the process of the present invention avoids the necessity of ever adding biocides or additional surfactants to the central coolant system, a substantial decrease in the frequency of addition is obtained.

The effective removal of tramp oils means that less surfactant is utilized in the loose emulsification of tramp oils into the coolant. The regular sterilization of the withdrawn portions of the central system coolant by operation of the process of the present invention, means that bacteria levels are greatly reduced, the bacteria reproduction rate is substantially inhibited, and the sterilization of the total volume of the coolant at 16 hour 40 minute intervals— assuming a by-pass rate of 0.1%—means that bacterial reproduction is further inhibited. Finally, the removal of the tramp oil means that both the bacteria and fungi have less contaminants upon which to feed, further reducing the bacterial and fungal level.

THE APPARATUS OF FIGS. 2 AND 3

Figure 2:
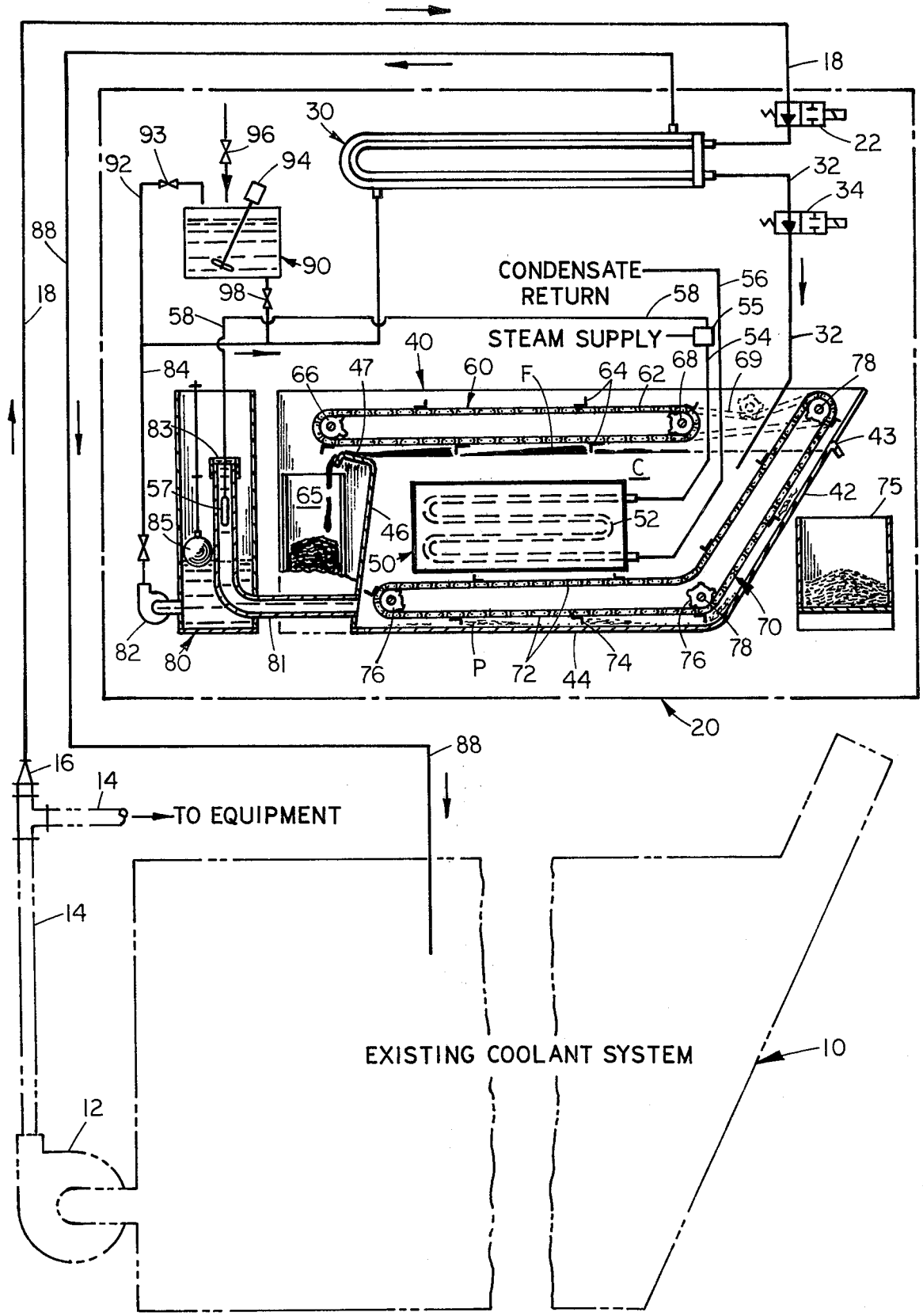
FIG. 2 is a somewhat schematic drawing of a first embodiment of the apparatus of this invention.

Referring next to the schematic flow diagram in FIG. 2, there is disclosed in double dot and dash lines a separating tank 10 of a central or existing coolant system. The output of clean coolant from the tank 10 enters the system circulating pump 12 and flows through the pipe line 14 for return to the equipment or machines in which the coolant is used, such as grinding and/or cutting machines. This pipe or duct 14 communicating with a reduced by-pass conduit 16 by-passes the flow of clean coolant from tank 10 to the apparatus 20 of the present invention.

The conduit 18 from the reduction valve 16 enters the treating system and apparatus of this invention encircled in the dot-dash rectangle 20. At the input of line 18 into this treating system there may be provided a solenoid or other type valve 22 which may be used to prevent the by-passed coolant from flooding the system in rectangle 20 in the event some clogging or difficulty occurs therein.

Figure 3:
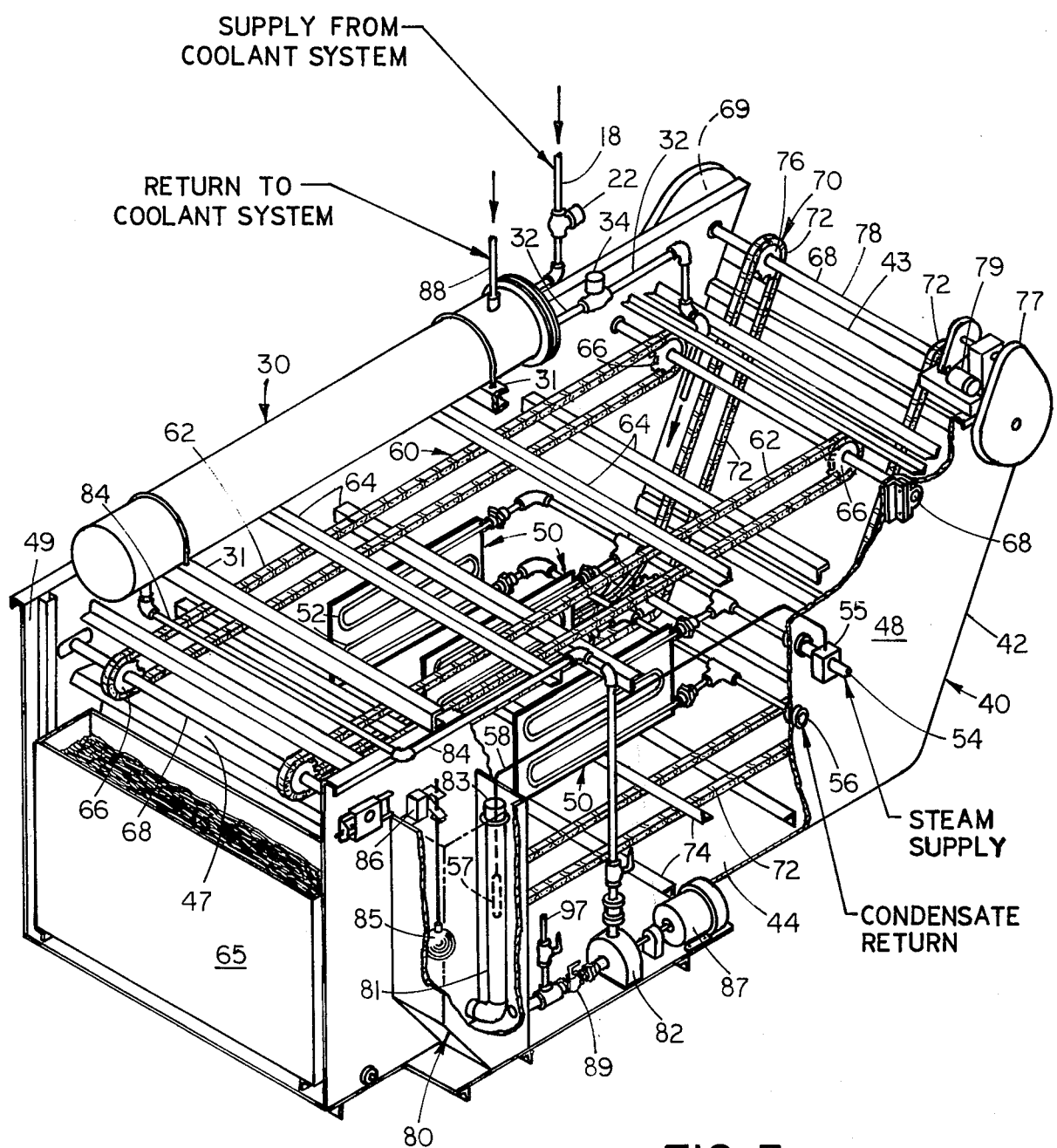
FIG. 3 is an enlarged perspective view with parts broken away, of the embodiment of the invention illustrated in FIG. 2.

Referring now to the specific embodiment disclosed in FIGS. 2 and 3, the by-passed coolant first passed through a pre-heating heat exchanger 30 and thence out through duct 32 which is provided with a primary control valve 34 which controls the volume of liquid passing through the apparatus of this invention. As hereinafter explained, the volume of coolant passed by valve 34 is substantially less than the total volume of coolant circulated by pump 12.

The by-passed coolant is introduced into the top of a settling tank 40. This tank 40 is shown to be an open top rectangular tank with a heater 50 therein, a mechanical skimmer 60 for the tramp oil from the surface of the liquid, and a bottom scraper conveyer 70. The resulting heated, sterilized, and purified liquid from the tank 40 is then collected in a clean coolant reservoir 80 from whence it is pumped by a pump 82 through duct 84 back to the heat exchanger 30 for cooling and simultaneously heating the incoming by-passed stream of coolant, before being returned through duct 88 back to the existing or central coolant system.

If desired, the heated coolant in duct 84 may be bypassed through a mixing tank 90 where makeup materials are added to the coolant. Since the coolant treated by the process of this invention contains at least some water and some oil, the additives thereto may include oil, water, and/or any one of the well known additives employed to make such coolants or cutting oils, such as alkaline salts, emulsifiers, fatty acids, fatty oils, bactericides, fungicides, and/or the like. These make-up materials can be concentrates of the additives and are added as needed to make-up any coolant ingredients lost in both the existing and present coolant systems, such as in the removal of the flotsam, and settlings. The by-pass duct 92 from the duct 84 preferably is provided with a valve 93 to regulate the amount of liquid introduced into the mixing tank 90, which tank may be provided with a mechanical mixer or stirrer 94 for thoroughly mixing the additive into the coolant. The additive material or materials may be introduced into the mixing tank 90 through a valve duct 96 continuously or intermittantly. After the mixing is effected, the tank 90 may be drained back into duct 84 through a valved duct 98. If desired, make-up materials may be added either directly into the duct 84 from the duct 96, and if some mixing is desired, it may be introduced such as via valved duct 97 in FIG. 3 into the input of the pump 82.

Referring now more specifically to FIG. 3, the specifically disclosed tank 40 has a sloping discharge end 42 terminating in an upper edge 43, the end wall 42 having a lower edge joined by a curved surface to the bottom 44 of the tank. The other end 46 of the tank 40 is provided with an outwardly extending ramp flange having an overflow edge 47, located at a lower level than the edge 43.

Suspended in the central portion of the tank below the upper edge 47 and above the bottom 44 is a heat exchanger 50 which may comprise a plurality of parallel vertical plates in extended surface contact with a number of serpentine ducts 52 through which a heated fluid, such as steam, is circulated from supply conduit 54 extending through one of the side walls 48 of the tank 40. Return condensate of the steam or of the heating fluid from the heater ducts 52 is conducted through return duct 56 through the same side wall 48 of the tank 40. The inlet duct 54 of the heaters 50 may be provided with a temperature responsive valve 55, which may automatically respond to the temperature of the coolant by a bulb 57 and tube 58 extending into the coolant outlet flow from the tank 40 to control the flow of heating fluid through the ducts 52, so as to maintain the coolant at a predetermined temperature.

Figure 5:
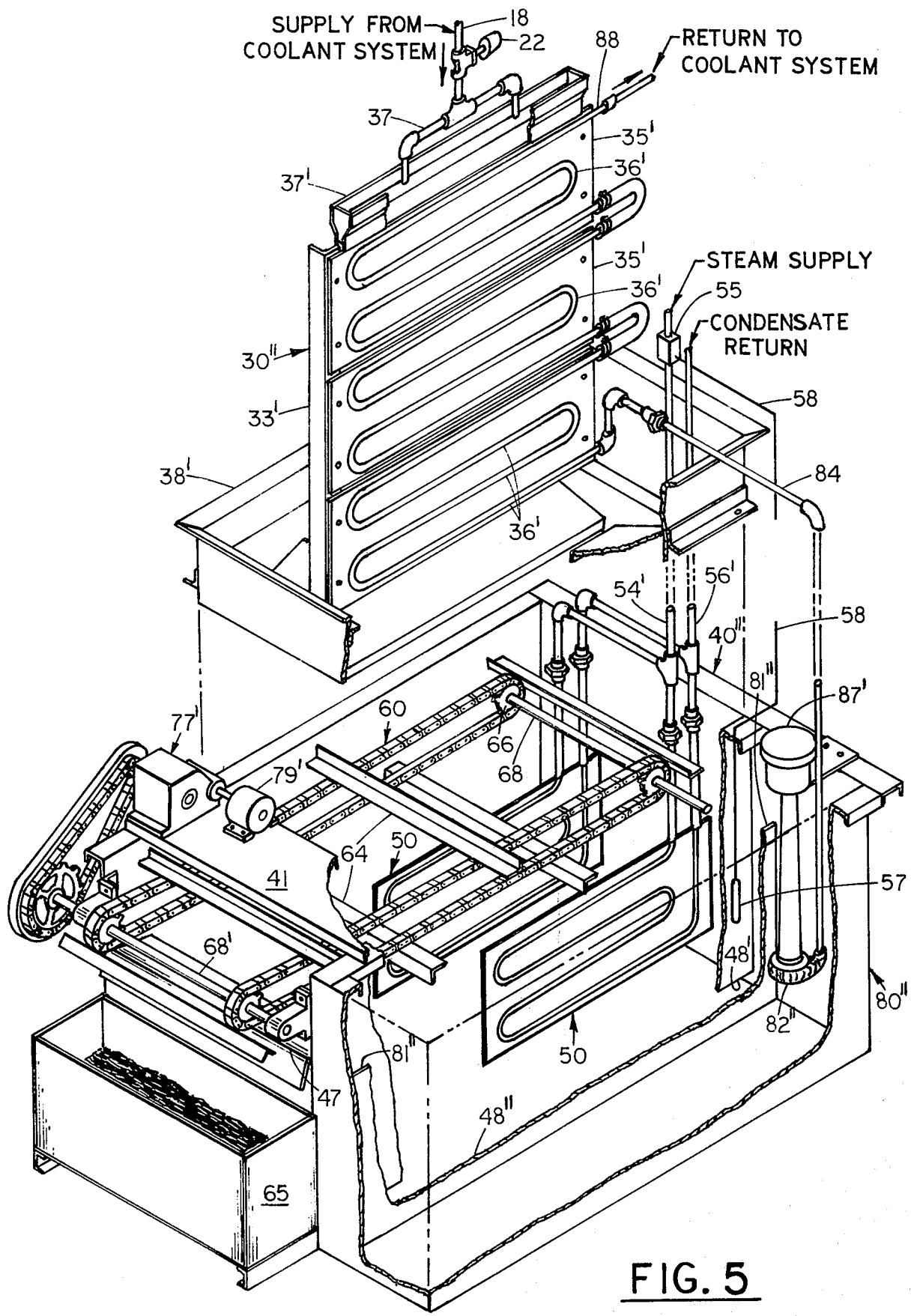
FIG. 5 is an exploded perspective view similar to FIGS. 3 and 4 but of still another embodiment of the apparatus.

As hereinafter explained, the heating of the coolant in the tank 40 not only kills bacteria but also releases trapped tramp oil from the coolant. This released tramp oil, which is less dense than the coolant, floats to the top of the heated coolant C in the tank to form a tramp oil and/or flotsam layer F. This flotsam layer F is skimmed off over the upper ramp flange edge 47 of the tank end wall 46, either by overflow and/or by a mechanical skimmer 60. This skimmer 60 includes a pair of parallel endless chains 62 having transverse flights 64 which urge the tramp oil and flotsam F across the surface of coolant in the tank and up over the ramp edge 47 into a tote box 65 provided therefor. The parallel endlesss chains 62 are trained about sprocket wheels 66 mounted on parallel shafts 68, the shafts being journalled in the parallel side walls 48 and 49 of the tank 50. One of the shafts 68 is driven by a suitable sprocket chain 69 to the driving mechanism for the bottom scraper conveyer 70, or alternatively the shaft may be driven directly by a separate drive motor 79' therefore through a gear reduction mechanism 77', e.g., as shown in FIG. 5.

Solid particles or "fines" may gravitationally settle from the heated quiescent coolant C in the tank 40, particularly where loosely emulsified or entrapped tramp oil is released from the coolant as above explained. These fines accumulate in the bottom of the tank 40, and the apparatus of FIGS. 2 and 3 provide means for intermittently or continuously removing such fines. A separate bottom scraper conveyor means 70 is provided in the tank 40 for the removal of these fines and settled particles P. This conveyer means 70 includes a pair of parallel endless chains 72 joined by transverse scraper flights 74 which scrape the bottom 44 of the tank 40 and move the settled particles P up inside of the sloping end 42 to be pushed out over the edge 43 into a tote box 75 or other collecting device. The sprocket chains 72 pass around sprocket wheels 76 mounted on parallel horizontal shafts 78, the ends of which shafts are journalled at the sides 48 and 49 of the tank 40. Two of these shafts 78 are adjacent the two bottom edges of the ends 42 and 46 and a third shaft 78 is located above the upper edge 43, which upper shaft may be extended through outside the tank walls 49 and 48 for driving connection with the sprocket chain 69 of the skimmer 60 and with a gear mechanism 77 (see FIG. 3) and driving motor 79. This motor 79 may be run continuously or intermittently, as desired. In the specific embodiment of FIGS. 3 and 4, the motor 79 also drives the mechanical skimmer 60. However, separate motors for each of these conveyer means 60 and 70 may be provided without departing from the scope of this invention.

The resulting heated, settled, skimmed, and sterilized coolant C from the central portion of the tank 40 now may be removed through an "L"-shaped outlet duct 81 having its upper leg providing an upper overflow edge 83 in the clean coolant reservoir 80. The location of the overflow edge 83 determines the level of coolant in the tank 40. This reservoir 80 may be provided with a float 85 which operates an electric switch 86 for controlling the input valve 22 in duct 18 from the central or existing coolant system and to prevent overflow of the system in rectangle 20 in the event the pump 82 fails.

The heat exchanger 30 in this embodiment is shown to be a conventional tubular type heat exchanger, and may be mounted on the top of the tank 40 by means of supporting brackets 31 that extend between the opposite side walls 48 and 49 of the tank 40.

THE APPARATUS OF FIG. 4

Figure 4:
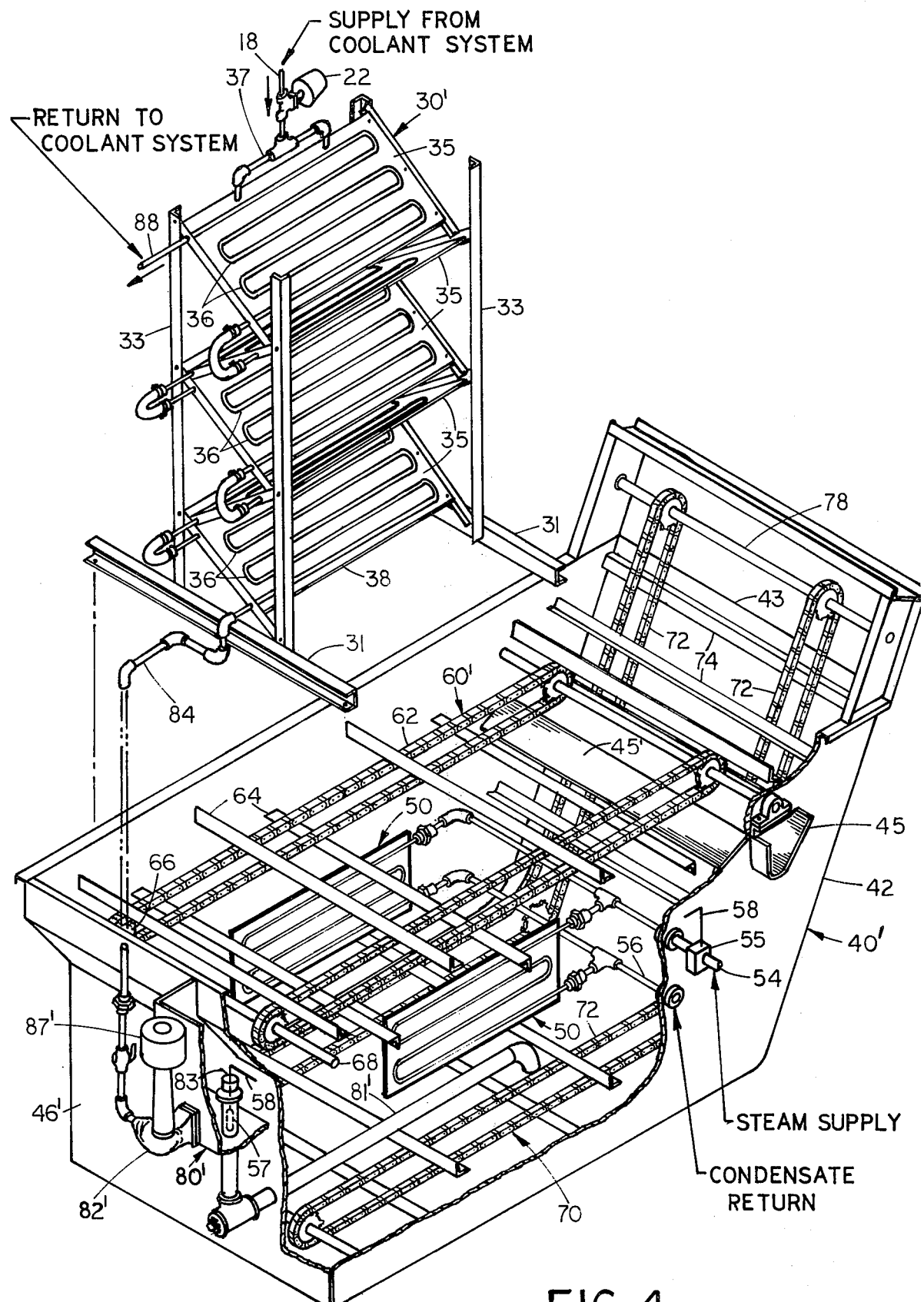
FIG. 4 is an exploded perspective view similar to FIG. 3 of another embodiment of the apparatus of this invention.

Since the essential elements of this invention may take different forms in performing the same functions, the other embodiments of this invention described in FIGS. 4 and 5 have reference characters for their parts which are the same or similar to the reference characters of the parts having the same functions as those already described in FIGS. 2 and 3.

Referring now specifically to the embodiment shown in FIG. 4, it differs from the embodiment shown in FIG. 3 in that it has a different type of heat exchanger 30', namely a zig-zag plate cascade type, which is shown elevated above its normal position on the top of the tank 40' so that it will not hide the other parts shown in the drawing. This heat exchanger 30' is mounted on bracket means 31 spanning the tank 40' and is supported on vertical posts 33 which support the corners of a plurality of plates 35 containing serpentine coils 36 through which return the heated and sterilized coolant from the tank 40' flows. The return coolant passes through each of the coils of the zig-zag angling plates 35 and through the return duct 88 back to the central or existing coolant system. The incoming coolant from the central system flows from conduit 18 through valve 22 and branch conduits 37 onto the top face of the upper plate 35 of the heat exchanger 30'. The coolant, at the temperature of the system, cascades down over the upper surfaces of each of the plates 35 which are heated by the hot return coolant in the coils 36. The incoming coolant is heated, and the pre-heated incoming coolant finally drips over the lower edge 38 of the bottom plate 35 directly into the open top of the tank 40'.

This tank 40' also contains a heat exchanger 50 and a bottom scraper conveyer 70 similar to those shown in FIGS. 2 and 3. However, its skimmer conveyer 60' is driven in the opposite direction to the one shown in FIGS. 2 and 3, in that its overflow edge ramp 45' empties floating tramp oil into a trough 45 at the same end of the tank 40' as the sloping end 42.

The heated, sterilized, relatively oil-free and solids-Free coolant is removed from the center of the tank 40' through duct 81' overflowing at 83 into a clean coolant reservoir 80'. The inlet of the return circulating pump 82' is directly connected to the bottom of the reservoir 80', with its drive motor 87' axially above it. The output of this pump 82' pushes the coolant to be returned through the duct 84 and coils 36 of the heat exchanger 30' to the return duct 88.

THE APPARATUS OF FIG. 5

In FIG. 5 there is shown still another embodiment of this invention which differs from the previously disclosed apparatus by (1) having a different type of cascade heat exchanger 30'', (2) eliminating the bottom scraper conveyer, and (3) having a large side clean coolant reservoir 80''. This reservoir 80'' communicates with the main tank 40'' under a baffle edge 48' of the tank 40'' and over the top of a side weir edge 81'' which weir edge is below the tramp oil overflow edge 47.

The heat exchanger 30'' comprises a series of vertical plates 35' bearing a single serpentine coil 36'. The lower end of the coil 36' is connected to the clean coolant duct 84 receiving the clean coolant from the reservoir 80'' via sump pump 82'' driven by an axially vertical motor 87'. Thus the heated coolant is pushed upwardly through the serpentine coils 36' of the plates 35' and then into duct 88 for return to the existing or central coolant system.

The by-passed coolant to be preheated in this heat exchanger 30'' is introduced through a manifold 37 into a distributor trough 37' over the top edge of both sides of the uppermost plate 35' to flow down both sides of each of the plates 35' until it drops into a larger bottom distributor trough 38' resting on the top of the open tank 40''. The heat exchanger 30'' is supported on the trough 38' by vertical posts 33'. Here, as in FIG. 4, the heat exchanger 30'' is shown raised above its normal position of rest upon the top of the tank 40'' so as not to hide the parts in the tank 40'' in this drawing.

Since this embodiment in FIG. 5 does not have a bottom scraper conveyer, the skimmer conveyer 60 has its own driving motor 79' mounted on a plate 41 on top of the tank 40'', the motor 79' being connected through a reduction gear mechanism 77' to drive the end of the shaft 68' of the skimmer conveyer 60. Also in this embodiment, the steam lines 54' and 56' to and from the heaters 50 extend upwardly through the open top of the tank 40''.

The valves of the systems described above may be automatically opened periodically and closed again to their pre-set positions in order to prevent them from clogging and to insure their continuous and proper flow of fluids through them.

While there is described above the principles of this invention in connection with specific apparatus, it is to be clearly understood that this description is made only by example and not as a limitation to the scope of this invention.

I claim:

1. In a process for use in a machine tool coolant system containing a circulating body of aqueous coolant emulsion containing as impurities bacteria, particulate solid contaminants and tramp oil, said tramp oil being present as a separate liquid phase entrapped in said emulsion and wetting said solid contaminants; the steps of:

A. continuously withdrawing from about 0.01% to 1% per minute of the volume of said circulating emulsion, B. continuously preheating the withdrawn emulsion in a heat exchange means, C. heating said withdrawn emulsion to a temperature of from about 160° to about 200°F. while retaining at said temperature and substantially quiescent in a pool in a tank for a period of time on the order of from about 30 to about 90 minutes to, substantially simultaneously, (1) kill the bacteria in said portion, (2) release entrapped tramp oil from said emulsion, and (3) release some of said solid contaminants from the emulsion of said oil, D. skimming the released tramp oil from the surface of said pool and removing it from said tank, E. settling and removing the released solid contaminants from said pool and said tank, and finally F. continuously returning the withdrawn coolant from said tank to the circulating body of emulsion through said heat exchange means thereby performing the preheating step B.

2. An apparatus for use in a machine tool coolant system containing a circulating body of aqueous coolant emulsion containing as impurities bacteria, tramp oil and solid contaminants, the tramp oil being present as a separate liquid phase entrapped in said emulsion and wetting said solid contaminants, the improvements of:
   a. a tank,
   b. first conduit means connecting the tank to the coolant system and accommodating the flow of coolant from the system to the tank,
   c. second conduit means connecting the tank to the coolant system and accommodating the return flow of coolant from the tank to the system,
   d. flow control means in one of said conduit means,
   e. said first and second conduit means and said flow control means, being constructed and arranged bypass from about 0.01% – 1% per minute of the volume of the circulating body through the tank,
   f. said tank being of a capacity and being constructed and arranged to retain therein the bypassed portion as a quiescent pool for at least one half hour,
   g. heating means located in said tank and in heat exchanger relation with the pool of coolant retained in the tank,
   h. control means for said heating means to maintain the coolant in said quiescent pool at a temperature of from about 160°F. to about 200°F.,
   i. skimming means located at the surface of the pool for removing tramp oil from the pool and from the tank,
   j. solids removal means located at the bottom of the pool for removing solid contaminants from the pool and from the tank,
   k. a heat exchanger having first and second isolated fluid passages in thermally conductive proximity to one another, said passages being interposed, respectively, in said first and second conduit means to utilize the residual heat of coolant in the second consuit means to pre-heat coolant in first conduit means,
   l. and a pump interposed in said second conduit means between said tank and said heat exchanger (1) to flow return coolant emulsion from said tank through said heat exchanger and (2) to agitate the still hot coolant to improve the dispersion of the coolant at substantially the temperature of said pool in the aqueous emulsion.

* * * * *

PO-1050
(5/69)

UNITED STATES PATENT OFFICE
CERTIFICATE OF CORRECTION

Patent No. 3,897,335     Dated July 29, 1975

Inventor(s) Robert H. BRANDT

It is certified that error appears in the above-identified patent and that said Letters Patent are hereby corrected as shown below:

Column 1, line 58 change "interfers" to - - interferes - - . Column 2, line 8, change "solids" to - - solid - -. Column 5, line 36, change "increase" to - - increases - -. Column 6, line 68 change "passed" to - - passes - -. Column 8, line 25, change "fore" to - - for - -. Column 9 line 50, change "Free" to - - free - -. Column 10, line 56, after "retaining" insert - - the same - -. Column 12, line 1, change "changer" to - - change - -; line 17, change "consuit" to - - conduit - -.

Signed and Sealed this

*second* Day of *December 1975*

[SEAL]

Attest:

RUTH C. MASON
*Attesting Officer*

C. MARSHALL DANN
*Commissioner of Patents and Trademarks*